United States Patent Office 3,046,704
Patented July 31, 1962

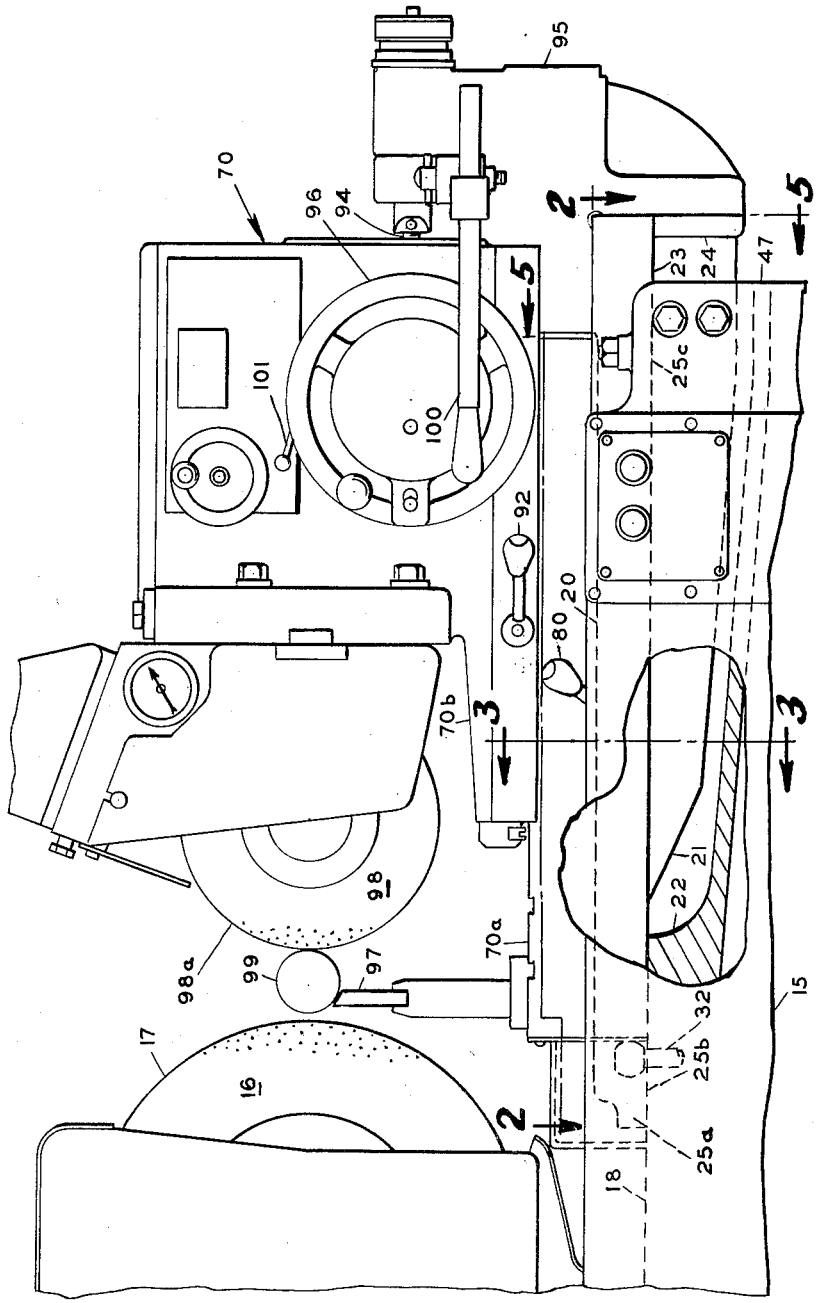

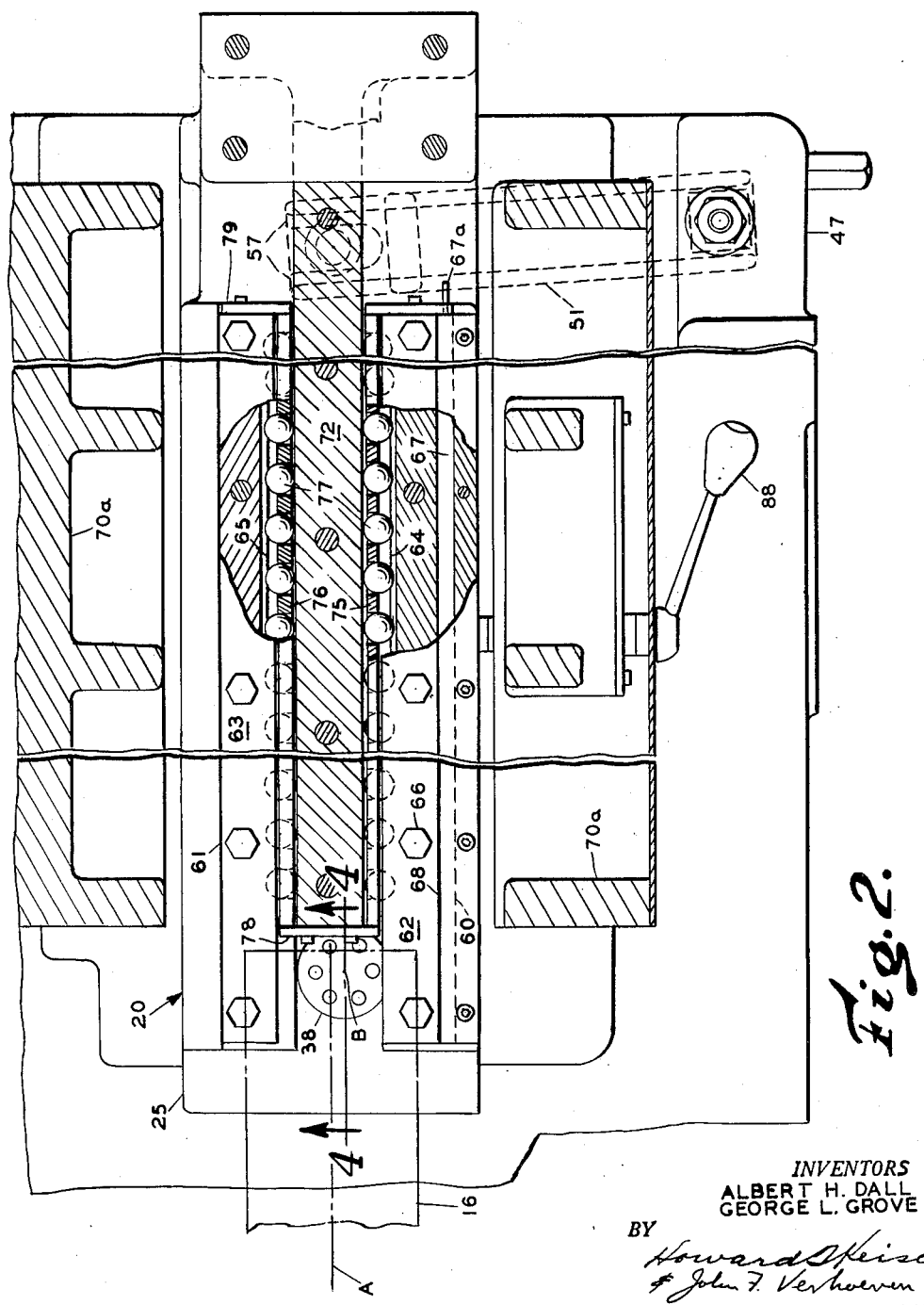

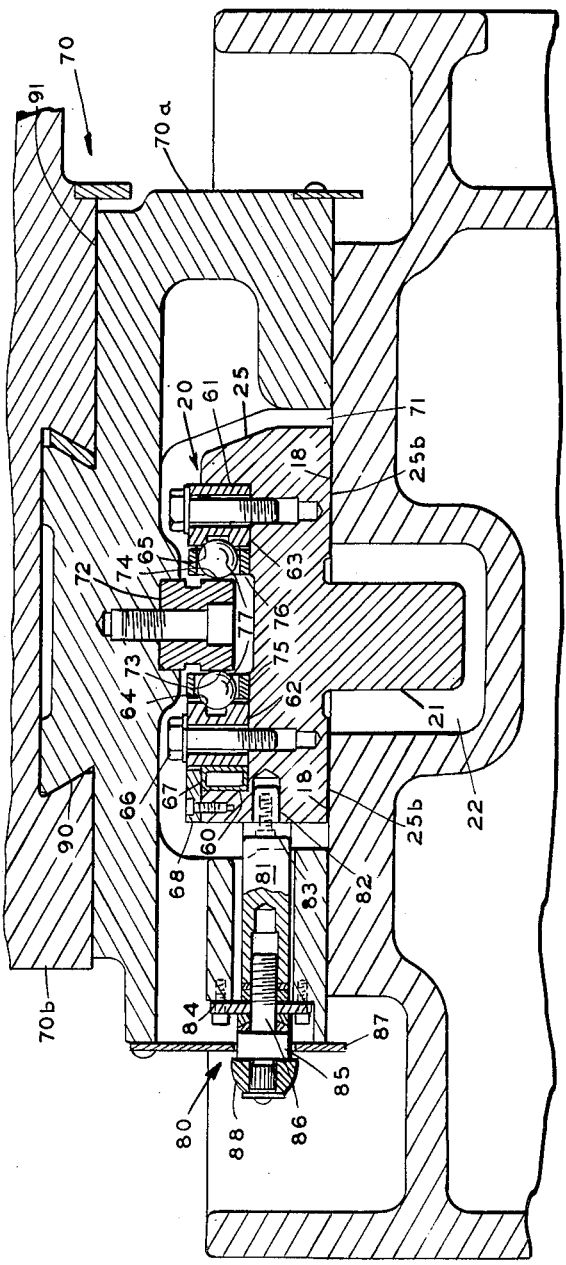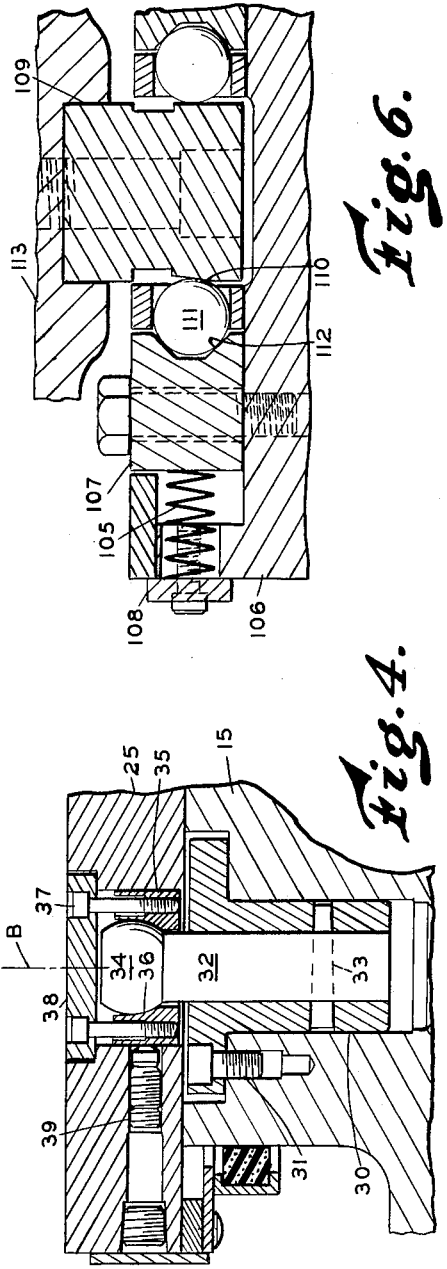

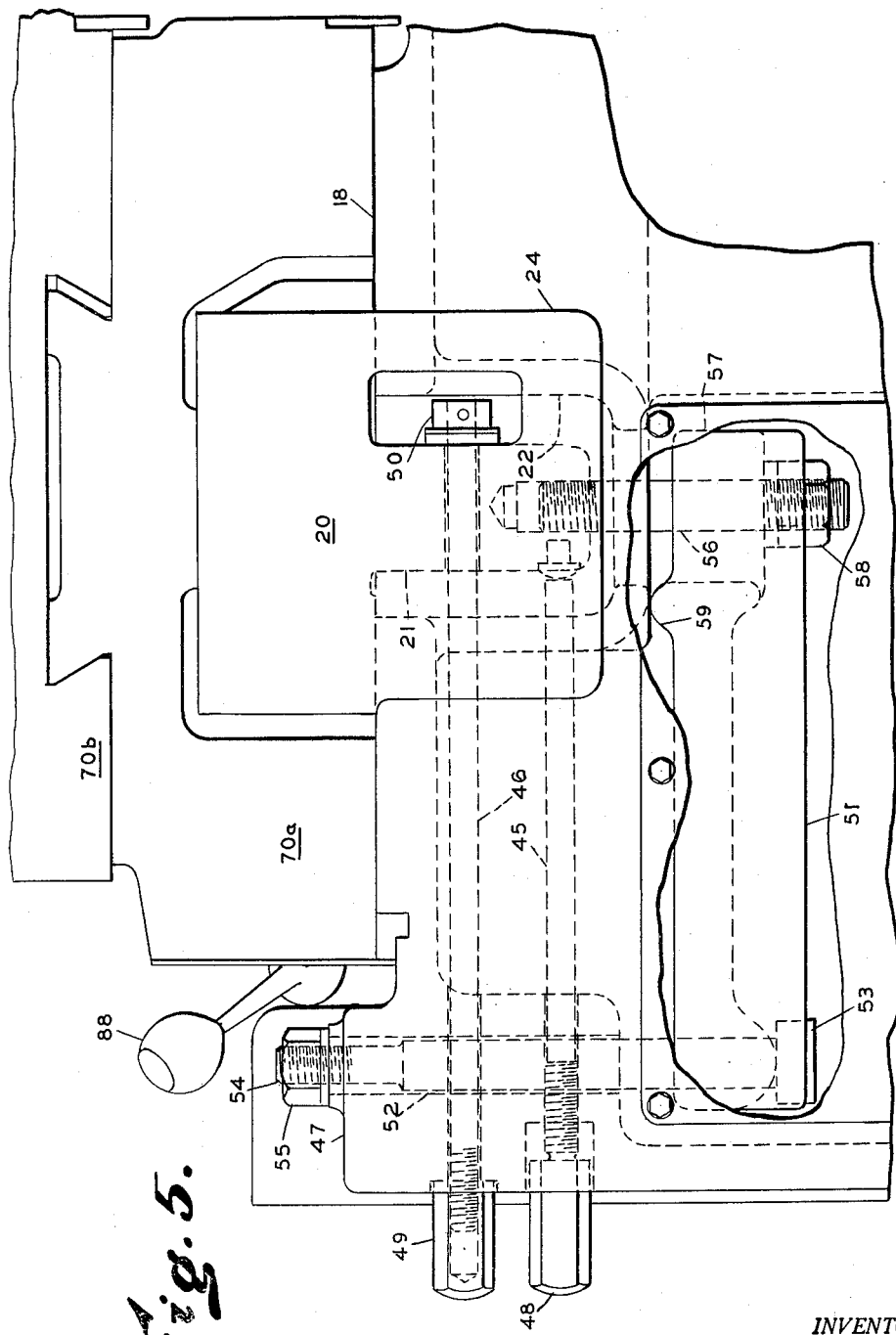

3,046,704
MACHINE TOOL SLIDE AND MOUNTING THEREOF
Albert H. Dall and George L. Grove, Cincinnati, Ohio, assignors to The Cincinnati Milling Machine Co., Cincinnati, Ohio, a corporation of Ohio
Filed Sept. 24, 1959, Ser. No. 842,007
10 Claims. (Cl. 51—103)

The present invention relates to a machine tool slide, and the mounting thereof, in a centerless grinding machine which supports the workpiece in grinding engagement with the grinding wheel.

In centerless grinding a workpiece is supported on a blade against a rotating regulating wheel, the regulating wheel being positioned opposite the rotating grinding wheel to hold the workpiece in grinding engagement therewith. In thrufeed grinding the regulating wheel and grinding wheel are held a fixed distance apart and the workpiece is moved axially along the blade between the wheels for grinding, the fixed distance between the workpiece engaging periphery of the wheels determing the finished diameter of the workpiece. In infeed grinding, the workpiece, which has a span to be ground of less extent than the width of the grinding and regulating wheels, is not moved axially on the blade but, instead, the blade and the regulating wheel, with the workpiece in position on the blade against the regulating wheel, are moved as a unit into the grinding wheel for grinding, the final relative position of the workpiece engaging peripheries of the wheels determining the final size and conformation of the workpiece.

In a centerless grinding machine it is desirable that the regulating wheel be pivotal, through at least a small angle, about a vertical axis, relative to the plane of the grinding wheel so that the workpiece engaging periphery of the regulatin wheel can be precisely adjusted in desired angular relation to the workpiece engaging periphery of the grinding wheel. For example, when infeed grinding is utilized to produce a cylindrical workpiece, the regulating wheel will be angularly adjusted relative to the grinding wheel until the respective peripheries of the wheels are parallel so that taper in the workpiece will be avoided.

In a typical mounting used heretofore the slide carrying the workpiece supporting blade and the regulating wheel is mounted on a swivel plate for linear movement of the slide on said plate towards and away from the grinding wheel. The plate is pivotally mounted on the base of the machine and can be swung to angularly adjust the regulating wheel relative to the grinding wheel.

In the present invention, as embodied in a centerless grinding machine, a simple, more rigid, construction is provided in which the slide, instead of being mounted on a swivel plate, is mounted directly on the upper surface of the base. The slide is engaged with a pivotal guide member which can be angularly adjusted relative to the plane of the grinding wheel to estatblish the angular adjustment of the slide, and hence the regulating wheel thereon, relative to that plane. For infeed grinding operations, or for adjustment of the regulating wheel towards or away from the grinding wheel in thrufeed operations, the slide is movable on the upper surface of the base along the guide member in guided engagement therewith so that the regulating wheel remains in proper adjusted angular relation to the grinding wheel.

In the preferred form of the invention, the guide member comprises an elongated bar having means defining guide faces thereon, the guide bar being mounted on the upper surface of the base and pivotally connected at one end thereto. Means are provided to clamp the bar in a selected angular position on the base. The slide which supports the workpiece is mounted on the upper surface of the base in straddling relation to the guide member. The engagement between the slide member and the guide member is accomplished by a pair of oppositely facing races on one member engaged with a plurality of balls on the other member, the balls being preloaded against the races to eliminate lateral play of the slide relative to the guide member. Thus the slide can be easily moved, with minimum tendency to stick, along the guide member on the base, the selected position of the guide member determining the path of the slide towards and away from the grinding wheel. With the slide solidly mounted directly on the base instead of on an intermediate member, the rigidity of the slide, and hence the regulating wheel, is increased and tendency for chatter is accordingly reduced.

It is therefore one object of the present invention to provide a slide rigidly mounted on a support member, or base, for movement thereon along angularly adjustable paths. It is another object of the present invention to provide a workpiece supporting slide for a centerless grinding machine which is mounted directly on the base of the machine for angularly adjusted linear movement thereon towards and away from the grinding wheel. It is yet another object of the present invention to provide a simple, rigid slide for a centerless grinding machine mounted directly on the base thereof and in guided rolling engagement with an angularly adjustable guide member for movement with minimum friction towards and away from the grinding wheel along a selected path determined by the position of the guide member. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:
FIG. 1 is a fragmentary elevational view of a centerless grinding machine embodying the present invention;
FIG. 2 is a view taken on the line 2—2 of FIG. 1;
FIG. 3 is a view taken on the line 3—3 of FIG. 1;
FIG. 4 is a view taken on the line 4—4 of FIG. 2;
FIG. 5 is a view taken on the line 5—5 of FIG. 1; and
FIG. 6 shows an alternate construction of the guide member and guide rib.

There is shown in FIG. 1 a centerless grinding machine having a base 15 on which is mounted a grinding wheel 16 for rotation in a plane A about a fixed axis, the grinding wheel having a workpiece engaging periphery 17. The base 15 has a horizontal upper surface 18 defining a flat way extending longitudinally parallel to plane A in front of the grinding wheel on which is mounted an elongated guide member 20. The guide member 20 comprises an elongated bar 25 on which is mounted members defining a pair of upstanding guide faces. The bar 25 has a stiffener rib 21 extending most of its length and depending into a well 22 in the base 15. The under surface of the bar 25, at the end 25a toward the grinding wheel where the rib does not extend, and the under surface of the bar 25 on each side of the rib, define a slide surface 25b received on the way 18. The guide bar 25 has integral therewith, at the end 25c away from the grinding wheel, an upper flange 23 and an end flange 24. As shown best in FIG. 4, the bar 25 of guide member 20 is pivotally connected, at the end 25a adjacent the grinding wheel, to the base 15 for swinging movement on the way 18 about the vertical pivot axis B and angularly adjustable positioning relative to the plane A of the grinding wheel. A sleeve 30, secured in the base 15 with bolts 31, receives the pivot pin 32 which is pinned therein at 33. The pivot pin has a spherical head 34 which is received in the guide bar 25 in a socket 35 having in its upper end a seat 36 to engage the underside of the head 34. The socket is connected by bolts 37 to a plate 38 received in a counterbore in the upper surface of the guide bar so that when the bolts 37 are tightened the guide bar 25 is drawn firmly against the base 15. When the bolts 37 have been adjusted to remove play between the guide bar 25 and the base, but to permit swinging of the guide bar on the base about the pivot axis B, set screw 39 can be tightened to lock the socket in adjusted position in the guide bar.

In order to swing the guide bar 25 to the desired angular position on the base relative to the plane of the grinding wheel, two rods 45 and 46 are provided which extend horizontally through a bracket 47 integral with the base. As shown in FIG. 5, the rod 45 is threadedly engaged with bracket 47 and has a head 48 integral therewith at one end extending outside the bracket, the opposite end of the rod engaging the near side of stiffener rib 21 at the end 25c of the guide bar opposite the pivot axis. The other rod 45 extends loosely through the bracket 47 and rib 21, the outer end threadedly receiving nut 49 outside bracket 47 and the inner end having collar 50 pinned thereto for engagement with the far side of stiffener rib 21. Thus by adjustment of head 48 and nut 49 the end 25c of guide member 25 can be swung in either direction on upper surface 18 of the base and, when both rods are engaged with the respective sides of stiffener rib 21, the guide bar will be held in the selected angular position.

At the end 25c the guide bar, after having been swung on the way 18 to the desired adjusted position thereon, can be clamped against the base by a lever 51 as shown in FIGS. 2 and 5. A bolt 52 is vertically received in bracket 47 and extends through a hole in one end of the lever. The head 53 of the bolt engages the under side of that end of the lever and the threaded shank 54 of the bolt, which extends above bracket 47, receives the nut 55. Another bolt 56 extends through an opening in the bottom of base well 22 and the upper end thereof is threadedly engaged with the depending stiffener rib 21 of the guide bar. The lower end of bolt 56 passes between arms 57 at the opposite end of the lever and nut 58 on the bolt supports that end of the lever. The lever has a protrusion 59 intermediate its ends which engages the bottom of the base well 22 to define a fulcrum for the lever. As the outer end of the lever is drawn up by the tightening of nut 55, the inner end thereof pulls the end 25c of the guide bar down firmly on the upper surface 18 of the base.

The guide bar 25 has outer upstanding walls 60 and 61 between which are received elongated strips 62 and 63, the inner sides of which constitute linear oppositely facing races 64 and 65 which, as shown in FIG. 2, are parallel in the longitudinal direction. Bolts 66, loosely received in strips 62 and 63, are thready engaged in guide bar 25. An elongated expandable tube 67 is received on the guide bar adjacent the outer edge of strip 62 and is contained by wall 60 and an upper strip 68 connected to the wall and extending over tube 67. The tube is closed at one end and has an air valve 67a at the other end for inflation of the tube.

A slide member, indicated generally at 70, is received on the upper surface 18 of the base in straddling relation to guide member 20, the slide 70 and base 15 defining an elongated recess 71 through which the elongated guide member extends. The slide 70 has a guide rib 72 depending into recess 71 and received between races 64 and 65, the sides of rib 72 defining inboard linear races 73 and 74 comprising flat vertical faces in opposing relation to, and in registration with, races 64 and 65, the races on the guide rib 72 being parallel in the longitudinal direction to the races of the guide member. The guide bar 25 receives thereon two linear ball retaining strips 75 and 76, the strip 75 between races 64 and 73 and the strip 76 between races 65 and 74. The ball retainer strips support balls 77 in two parallel rows. When bolts 66 are loose and tube 67 is inflated with air the balls 77 are urged into firm guiding engagement with the races 73 and 74 and, when bolts 66 are thereafter tightened, the balls are held in this preloaded condition against the races on the guide rib. Thus the depending rib portion 72 of the slide is held firmly between guide faces defined by the innermost edges of the balls so that lateral play between the guide member 20, comprising the guide bar 25 and the members mounted thereon, and the slide 70 is prevented. The depending portion 72 of the slide, however, can freely move longitudinally in the guide member, in guided rolling engagement therewith, and thus the slide can be moved, with minimum friction, along a path on the way 18 determined by the adjusted angular position of the guide member 20. Since the engagement of the guide 20 with slide 70 occurs through the balls 77, the sides of which engage the flat vertical races 73, 74 on the sides of the slide rib 72, as shown in FIG. 3, the guide 20 does not support the slide 70, which is solidly supported by base 15, but merely guides its movement on the base.

As the slide 70 and rib 72 thereof is moved longitudinally relative to the base 15 and guide member 20, the ball retainer strips 75 and 76 will slide on the guide bar 25, moving half the distance of the guide rib 72. In the extreme position of the slide 70 away from the grinding wheel, as shown in FIG. 2, the end of the ball retainer strips 75 and 76 toward the grinding wheel abut against plate 78 connected across the end of rib 72 towards the grinding wheel, and the opposite end of strips 75 and 76 abut against plates 79 connected across the end of the guide member strips 62 and 63 away from the grinding wheel The slide 70 can be clamped to the guide member 20, and thereby held against movement towards and away from the grinding wheel, by means of clamp 80. The clamp 80 has an inner portion 81, the inner end of which has a stud 82 received in guide member 20 and a flange 83 screwed thereto. The inner portion 81, which extends between web portions of the slide 70, terminates, at its outer end, in a shoulder adjacent a plate 84 connected across the outer ends of said web portions of the slide. The clamp 80 has an outer portion 85 having a threaded stud 86 extending through a slot in plate 84 and threadedly received in the inner portion 81 of the clamp, the outer portion 85 having an inner shoulder adjacent plate 84. The outer portion 85 of the clamp extends through an apron 87 on the slide and has a lever 88 connected thereto. When lever 88 is turned to draw the outer portion of clamp 80 towards the inner portion thereof, the plate 84 carried by the slide is clamped between the shoulders on the respective portions of the clamp and the slide is secured against longitudinal movement relative to the guide member.

The slide 70 comprises a lower portion 70a, having a dovetail 90, and upper slide surfaces 91, and an upper portion 70b received on the slide surfaces 91 over the dovetail 90. The two portions can be clamped together in conventional manner by clamp 92. The upper portion 70b of the slide has a nut (not shown) which receives feed screw 94. The feed screw 94 is journaled in bracket 95 and held against axial movement therein. The bracket 95 is connected to the top and end flanges 23 and 24 of the guide member. The nut is operatively connected to handwheel 96 for rotation thereby. The lower portion 70a of the slide has, at the end toward the grinding wheel, an upstanding workpiece supporting blade 97. The upper portion 70b of the slide has a regulating wheel 98 rotatably mounted thereon, opposite the grinding wheel, and having a workpiece engaging periphery 98a for holding the workpiece in grinding engagement with the grinding wheel.

For setup the clamp 92 is tightened, and clamp 80 loosened, and the slide 70 is moved as a unit by handwheel 96 to position blade 97 a desired distance from the grinding wheel. Clamp 80 is then tightened, and clamp 92 loosened, so that by rotation of handwheel 96 the upper portion 70a of the slide is moved longitudinally relative to the lower portion 70b thereof and the regulating wheel 98 is positioned relative to the blade 97 to accommodate the particular sized workpiece 99 which is to be ground. If, for example, the workpiece is to be cylindrical the rods 45 and 46 are adjusted until the workpiece engaging periphery 98a of the regulating wheel is parallel to the workpiece engaging periphery 17 of the grinding wheel.

For infeed grinding there is provided a lever 100 operatively connected to the feed screw 94 for rotation thereof. After the setup adjustments have been made, the nut in the upper portion 70a of the slide is locked against rotation by clamp 101, clamp 92 is tightened, and clamp 80 is loosened. Operation of lever 100 thus moves the slide portions 70a and 70b, which support the workpiece 99, as a unit towards and away from the grinding wheel, along the path determined by the guide member. The upper slide nut and clamp 101 are similar to the construction more fully described in U.S. Patent 2,709,-877 of Dall and Grove, issued June 7, 1955.

An alternative construction for the guide member is shown in FIG. 6. In this construction the expandable tube is not used to load the balls against the rib but, instead, a plurality of compressed springs 105 are received in the guide bar 106, the inner ends of which engage the elongated race strips 107 and the outer ends of which engage the strip 108 connected to the side of the guide member. In FIG. 6, there is also shown and alternative construction of the guide rib. That portion of at least one side of the slide rib 109 defining the race 110 against which the balls 111 are urged, although parallel to the opposing race 112 on the guide member in the longitudinal direction, is inclined relative to the perpendicular to the upper surface of the base so that the balls 111, when urged thereagainst by springs 105, impart a downward force to the guide rib 109, and hence the slide 113 and tend to hold the slide down firmly on the base.

What is claimed is:

1. In a center grinding machine, a base having a grinding wheel mounted thereon and having a flat way in front of the grinding wheel, a guide member pivotally connected to the base and angularly adjustable in a plane parallel to the way and relative to the plane of the grinding wheel, said guide member having means defining a pair of oppositely facing guide faces, a workpiece supporting slide having a pair of faces positioned for guiding engagement with said guide faces, respectively, said slide mounted directly on the way and supported solely thereby for guided movement thereon along said guide member towards and away from the grinding wheel.

2. In a centerless grinding machine, a base having a grinding wheel mounted thereon, an elongated guide member mounted on the base and pivotally connected thereto adjacent the grinding wheel for angular movement on the base relative to the grinding wheel, a slide having means adapted to support a workpiece, said slide mounted on the base and supported solely thereby, said slide straddling the guide member and in guided engagement therewith, means to hold the guide member in a selected angular position, and means to move the slide along the guide member on the base toward and away from the grinding wheel.

3. In a centerless grinding machine, a base having a grinding wheel mounted thereon for rotation in a plane, said base having an upper surface defining a flat way, an elongated guide member mounted on said way and having one end pivotally connected to the base adjacent the grinding wheel for swinging movement on the way relative to the plane of the grinding wheel, a slide mounted on the way for complete support by the base, said slide straddling the guide member and in guided engagement therewith, means carried by the slide to support a workpiece, means to hold the guide member in a selected angular position relative to the plane of the grinding wheel, and means to move the slide along the guide member on the way for feeding the workpiece into and out of grinding engagement with the grinding wheel.

4. In a centerless grinding machine, a base having a grinding wheel mounted thereon and a flat horizontal way in front of hte grinding wheel, a workpiece supporting slide member mounted on the way and supported solely by the base, the base and the slide member defining a recess therebetween, an elongated guide member in said recss pivotally connected to the base adjacent the grinding wheel and swingable on the way relative to the plane of the grinding wheel, one of said members having a pair of spaced oppositely facing flat vertical linear races parallel in their longitudinal direction and the other of said members having a plurality of rollers in registration with said races, means to preload said rollers into firm engagement with said races to establish guiding engagement only between said members, means to hold the guide member in a selected angular position on the upper surface of the base, and means to move the slide member on the base along the guide member towards and away from the grinding wheel.

5. In a centerless grinding machine, a base having a grinding wheel mounted thereon and having a horizontal upper surface, a slide member mounted on the upper surface of the base and supported solely thereby, an elongated guide member pivotally connected to the base for angular adjustment in a plane parallel to the upper surface of the base and relative to the plane of the grinding wheel, one of said members having a rib, the sides of the rib defining linear races parallel in the longitudinal direction, the other of said members having means defining linear races straddling said rib in opposing relation to the respective races thereon and parallel therewith in the longitudinal direction, the races on one of said members comprising flat vertical faces, a plurality of balls received between said opposing races and engaged with said flat vertical faces to establish guiding engagement only between the guide member and the slide member, and means to move the slide member on the base along a path determined by the guide member.

6. In a centerless grinding machine, a base having a grinding wheel mounted thereon and a horizontal flat way on the upper surface thereof in front of the grinding wheel, a workpiece supporting slide mounted on the way and supported solely thereby, the base and the slide defining a recess therebetween, the slide having an elongated portion depending therefrom into the recess, the sides of said depending portion defining flat vertical linear races parallel in the longitudinal direction, an elongated guide member in said recess pivotally connected at one end adjacent the grinding wheel to the base to swing on the way relative to the plane of the grinding wheel, the guide member having linear races straddling the depending portion of the slide in opposing relation to the respective races thereon and parallel in the longitudinal direction therewith, a plurality of balls received between the opposing races to establish guiding engagement only between the guide member and the slide, at least one of said races being movable laterally to preload the balls to hold said depending portion of the slide in the guide member without lateral play for rolling guided longitudinal movement therein, means to hold the guide member on the support member in a selected angular position, and means to move the slide on the support member along a path determined by the guide member towards and away from the grinding wheel.

7. In a centerless grinding machine, a base having a horizontal upper surface, a slide mounted on the upper surface of the base adapted to support a workpiece, said slide supported solely by the base and the base and the slide defining a recess therebetween, the slide having an elongated portion depending therefrom into the recess, the sides of the depending portion defining flat vertical linear races parallel in the longitudinal direction, an elongated guide bar in said recess pivotally connected to the base to swing on the upper surface thereof, the guide bar having strips thereon at least one of which is shiftable laterally on the guide bar, the inner sides of the strips defining linear races straddling the depending portion of the slide in opposing relation to the respective races thereon and parallel in the longitudinal direction therewith, a plurality of balls received between the opposing races to establish guiding engagement only between the guide member and the slide, an elongated tube on the guide bar confined adjacent the outboard edge of said one of said strips and expandable to urge the balls engaged by the race thereon into engagement with the vertical race on the depending portion of the slide to firmly hold said portion between said balls for firm rolling guided movement thereof in the longitudinal direction between the races on the guide bar, means to hold the guide bar on the upper surface of the base in selected angular positions, and means to move the slide on the base along a path determined by said selected position of the guide bar.

8. In a centerless grinding machine, a base member having a grinding wheel mounted thereon, an elongated guide member mounted on a surface of the base member in front of the grinding wheel, a pivot pin in the base member adjacent the grinding wheel extending through said surface into one end of the guide member, means in one of said members to secure the pin therein, means in the other of said members to secure the pin therein including a collar in said other member engaged with the head of the pin and adjustable axially relative to the pin to hold said one end of the guide member firmly but swingably against said surface on the base member, means to swing the guide member on said surface of the base member about the pivot pin and hold said guide member in adjusted angular position, and a workpiece supporting slide mounted on said surface of the base member and supported solely by the base member, said slide in guiding engagement only with the guide member for movement on said surface along a path determined by the angular position of the guide member.

9. In a centerless grinding machine, a base having a horizontal upper surface, an elongated guide member mounted on the upper surface of the base and pivotally connected thereto for angular positioning thereon, a workpiece supporting slide member mounted on the upper surface of the base and supported solely thereby, said slide member in straddling relation to the guide member, said slide member having a pair of spaced oppositely facing flat linear races parallel in the longitudinal direction, at least one of said races inclined relative to the perpendicular to said upper surface, the other of said members having a plurality of rollers in registration with said races, means to preload the rollers into firm engagement with the races to impart a downward force to said inclined race and the slide member whereby the force imparted to the races by the rollers tends to hold said slide member on the base, and means to hold the guide member on the upper surface of the base in a selected angular position.

10. In a centerless grinding machine, a base with a grinding wheel mounted thereon for rotation in a plane, the base having a flat way on the upper surface in front of the grinding wheel and extending longitudinally therefrom, a slide member mounted on the way and supported solely by the base, the slide member having a blade and regulating wheel thereon to support a workpiece, the slide and the base defining a recess therebetween, the slide having a rib depending into the recess and having sides parallel in the longitudinal direction defining linear inboard races, an elongated guide member mounted on the way in said recess and having one end pivotally connected to the base adjacent the grinding wheel for swinging movement about said end on the way relative to the plane of the grinding wheel, said guide member having a pair of outboard linear races straddling the rib in opposing relation to said inboard races and parallel in the longitudinal direction therewith, a plurality of balls received between the inboard and outboard races to establish guiding engagement between the guide member and the slide member, means to urge at least one of said outboard races inwardly to preload said balls for holding the rib in the guide member without lateral play and for guided rolling longitudinal movement therein, means to swing said guide member to a selected angular position, and means connected to the guide member to move the slide on the way along the guide member for movement of the workpiece into and out of grinding engagement with the grinding wheel.

References Cited in the file of this patent
UNITED STATES PATENTS

| | | |
|---|---|---|
| 2,160,777 | Dall et al. | May 30, 1939 |
| 2,466,478 | Riley | Apr. 5, 1949 |
| 2,620,775 | Champayne | Dec. 9, 1952 |
| 2,658,499 | Hoglund | Nov. 10, 1953 |
| 2,855,729 | Render | Oct. 14, 1958 |
| 2,963,832 | Ohringer | Dec. 13, 1960 |

UNITED STATES PATENT OFFICE
CERTIFICATE OF CORRECTION

Patent No. 3,046,704
July 31, 1962

Albert H. Dall et al.

It is hereby certified that error appears in the above numbered patent requiring correction and that the said Letters Patent should read as corrected below.

Column 1, line 37, for "regulatin" read -- regulating --; column 3, line 20, for "45" read -- 46 --; column 5, line 39, for "center" read -- centerless --.

Signed and sealed this 8th day of January 1963.

(SEAL)
Attest:

ERNEST W. SWIDER
Attesting Officer

DAVID L. LADD
Commissioner of Patents

Disclaimer 3,046,704.—*Albert H. Dall*, and *George L. Grove*, Cincinnati, Ohio. MACHINE TOOL SLIDE AND MOUNTING THEREOF. Patent dated July 31, 1962. Disclaimer filed July 1, 1969, by the assignee, *The Cincinnati Milling Machine Co.*

Hereby enters this disclaimer to claims 1, 2, 3 and 8 of said patent.
[*Official Gazette August 19, 1969.*]